Aug. 23, 1955   H. SCHNEIDER   2,715,876
LOCOMOTIVES
Filed March 6, 1950   9 Sheets-Sheet 1

Inventor
HEINRICH SCHNEIDER
Andrew F. Wintercorn
Atty

Aug. 23, 1955     H. SCHNEIDER     2,715,876
LOCOMOTIVES

Filed March 6, 1950     9 Sheets-Sheet 2

Inventor
HEINRICH SCHNEIDER
Atty

Aug. 23, 1955 H. SCHNEIDER 2,715,876
LOCOMOTIVES
Filed March 6, 1950 9 Sheets-Sheet 6

Fig.12

Inventor
HEINRICH SCHNEIDER
Atty

Aug. 23, 1955  H. SCHNEIDER  2,715,876
LOCOMOTIVES
Filed March 6, 1950  9 Sheets-Sheet 9

UNITED STATES PATENT OFFICE 2,715,876
Patented Aug. 23, 1955

2,715,876

LOCOMOTIVES

Heinrich Schneider, Muncie, Ind., assignor to Schneider Brothers Company, Muncie, Ind., a copartnership Application March 6, 1950, Serial No. 147,921

8 Claims. (Cl. 105—62)

The invention relates to locomotives driven by internal combustion engines or turbines using torque converter and mechanical gear drives.

The principal object of this invention is to provide locomotives with high power capacity, and low weight-power ratios, at low cost. The invention makes that possible by running the torque converter, transmission gear trains and shafts at high speed with relatively low weight up to the final reduction gears on the driving axles, and by the use of propeller shafts of equal length extending fore and aft from a centrally arranged transfer gearbox and connected with the axles by universal joints, thereby providing mechanically driven swivel truck type locomotives, allowing safer operation on curves at high speeds.

Another object of the invention is to provide high torque increase and tractive effort by the arrangement of a multiple speed ratio planetary gear located adjacent to a transfer gearbox, the latter containing forward and reverse gears.

An important feature of the invention is the fact that it makes optional use of one or two power plants using the same gear train drive and trucks.

Big power capacity diesel locomotives with high power-weight ratios can best be achieved by the use of two engines and relatively small light gears and power transmission mechanism as herein shown, whereby to make the full length of the locomotive frame available for powerplant and power transmission mechanism and obtain even distribution of weight by use of a symmetrical arrangement of these units, the power plants being furthermore placed directly over the trucks in order to enable use of a lighter frame.

Another object is the use of right angle gears and spur reduction gears on the driving axles to enable changing gear ratios for low and high speed locomotives without changing other components of the locomotive.

The invention is illustrated in the accompanying drawings, in which—

Fig. 13 is a view partly in side elevation and partly in longitudinal section through one of the hydraulic brakes on the idler shaft of the reverse gears in the transfer gearbox;

Similar reference numerals are applied to corresponding parts throughout these views.

Figure 1:
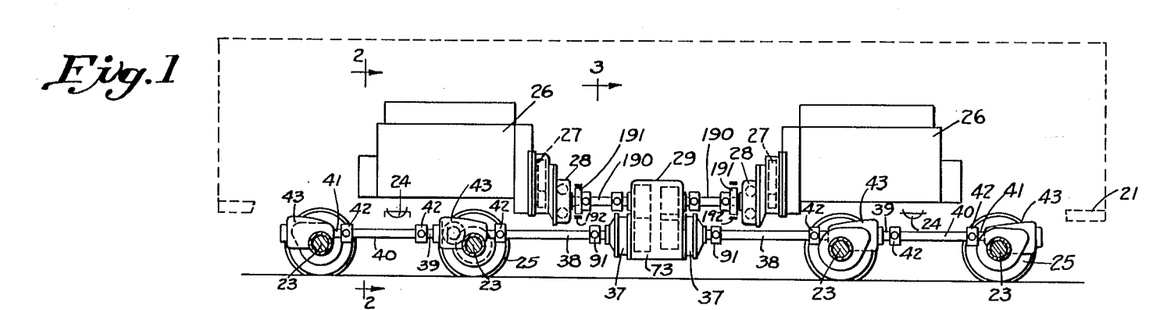
Fig. 1 is a schematic or phantom side view of a locomotive showing the preferred embodiment of my invention insofar as the power plant and drives are concerned.
Figure 2:
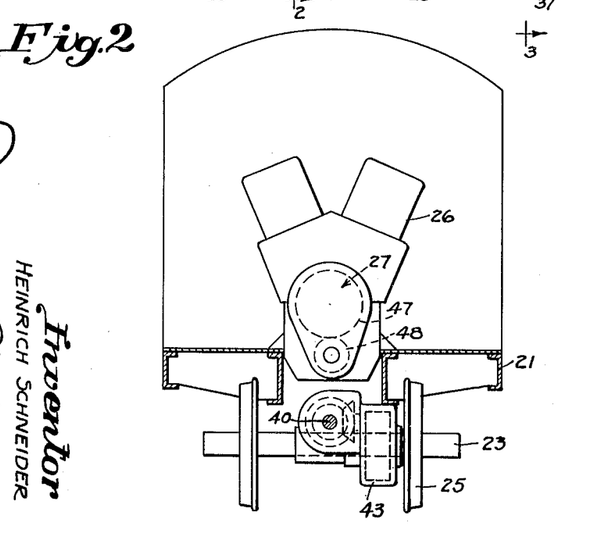
Fig. 2 is a cross-section of the locomotive, on line 2—2 of Fig. 1, showing power plant, axle drive and frame.
Figure 3:
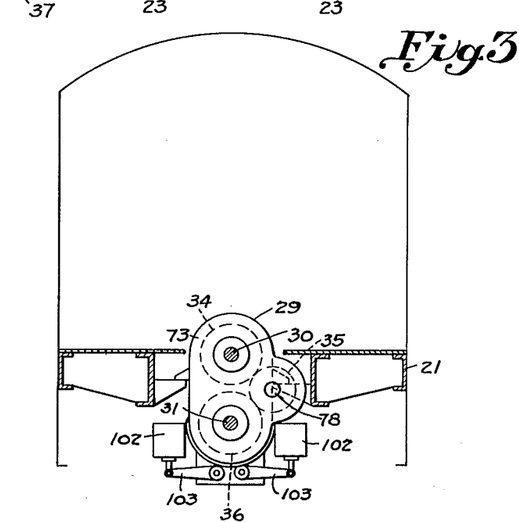
Fig. 3 is a cross-section of the locomotive, on line 3—3 of Fig. 1, showing the transfer gearbox mounted in the frame.
Figure 4:
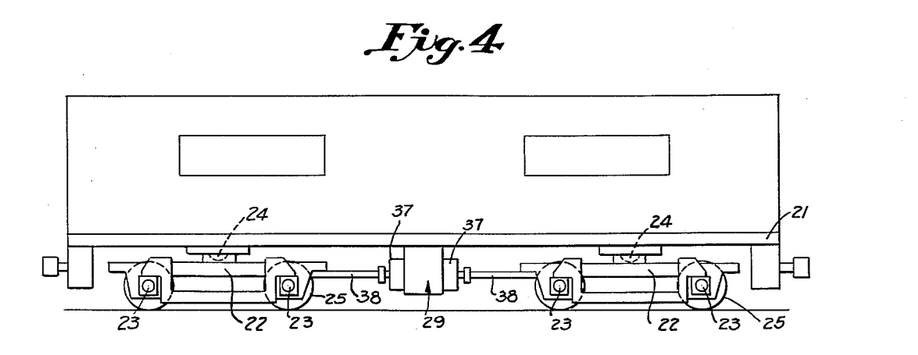
Fig. 4 is a more or less diagrammatic side view of the locomotive showing frame, body and trucks, and indicating transfer gearbox and propeller shaft drive.

The problem in building a high-powered diesel locomotive, namely, one having power equal to or greater than steam locomotives deliver, that is to say 3,000 to 6,000 H. P. or more in one unit, is to arrange the power plant and transmission in the space available and within the weight limitations determined by the axle load. That cannot be done today with the diesel-electric drive nor with the known designs of the diesel-hydraulic-mechanical drives. The present invention, as shown in Fig. 1, makes that possible by the use of two diesel engines and the symmetrical arrangements of power plants, hydraulic torque converters, mechanical transmissions and axle drives. By using a common transfer and reverse gear box with high speed gearing and dividing the power by means of two planetary change speed gears running at high speed also, high powered diesel locomotives can be built with the weight and space limitations required by the railroads. By arranging the transfer gear box in the center between the trucks, universal drive shafts of equal and medium length can be used, allowing safer high speed running of the locomotive on curves.

Figures 6, 7, 9, 10:
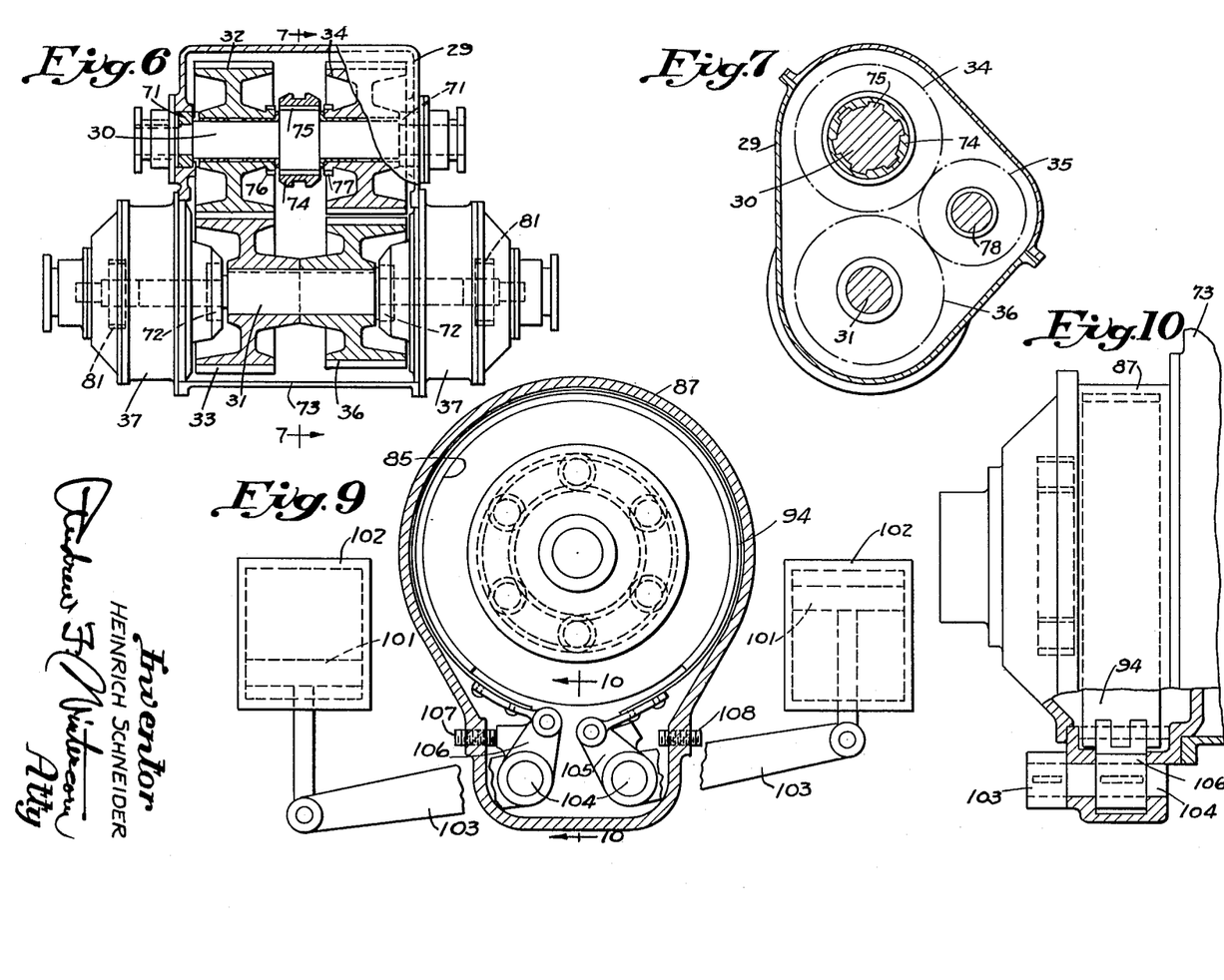
Fig. 6 is a longitudinal section through the transfer gearing box showing forward and reverse gears and a side view of the housings of the planetary gears.
Fig. 7 is a cross-section on line 7—7 of Fig. 6 showing the reverse gears.
Fig. 9 is a cross-section on line 9—9 of Fig. 8 showing the brake band operating mechanism of the planetary gearing.
Fig. 10 is a view partly in side elevation of Fig. 9 and partly in section on line 10—10 of Fig. 9 to better illustrate the brake band operating mechanism.

Referring to Figs. 1 to 4, the locomotive has a body frame 21, two trucks 22 with driving axles 23 and driving wheels 25. Frame 21 is mounted on the trucks 22 by means of swivel bolsters 24. Two power plants 26 transmit drive through change speed gears 27 and torque converters 28 into a transfer gearbox 29, in which are provided, as shown in Fig. 6, an input shaft 30, an output shaft 31, forward gears 32 and 33, and reverse gears numbered 34, and 36. On each side, fore and aft of the transfer gearbox 29 and in coaxial relationship with the output shaft 31 is arranged a multiple planetary gearing 37 driving propeller shafts extending in fore and aft relationship to gearbox 29. Each propeller shaft consists of several sections numbered 38 to 41 connected by universal joints 42, and transmits drive through bevel and spur reduction gearing 43 to the individual driving axles 23 of trucks 22.

The transfer gearbox 29 is arranged halfway between the two trucks 22 substantially in the middle of the locomotive and the propeller shafts 38—41 are disposed on the longitudinal centerline of the locomotive over the driving axles 23 of the trucks 22 and under the power plants 26 and torque converters 28.

Figure 5:
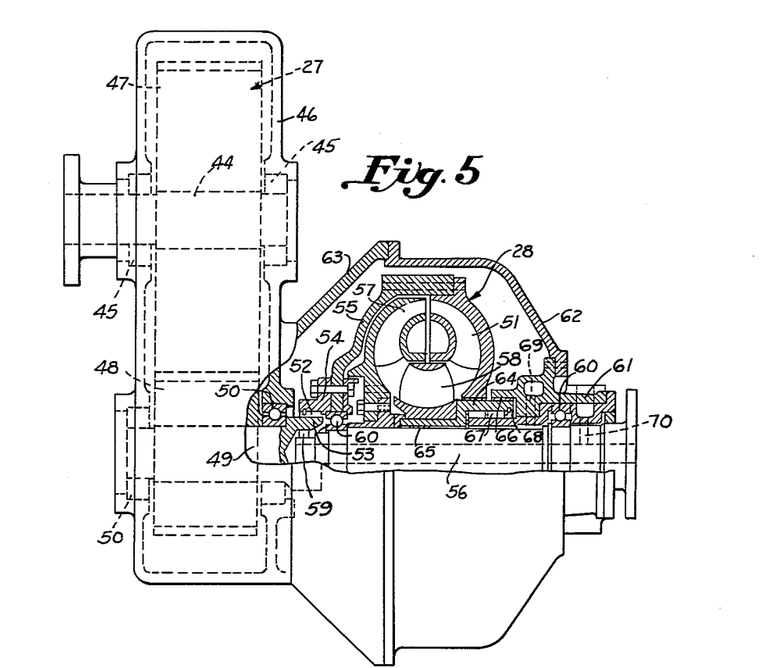
Fig. 5 is a view partly in side elevation and partly in longitudinal section of the torque converter and the speed-up gearing.

Power plant 26 is herein shown as a diesel engine which transmits drive through speed-up gears 27 to the torque converter 28, as shown in Fig. 5. The change speed gears 27 being speed-up gears, in the case of a diesel engine power plant, have an input shaft 44 driven by the crankshaft of the power plant 26, preferably through a flexible coupling. Shaft 44 is mounted in a bearing 45 in housing 46 and has fixed thereon a large gear 47 meshing with a smaller gear 48 on a shaft 49 that is mounted in bearings 50 in housing 46. When two diesel engines are used as power plants, one speed-up gearing comprises two gears and the other three gears to make possible the use of identical engines with the same direction of rotation. Shaft 49 drives the impeller wheel 51 of the torque converter 28 by means of a one-way clutch 52, shaft 49 having its inner end portion forming the inner race 53 and the outer race 54 being bolted to cover member 55 which drives impeller wheel 51. When the engine is standing still, the one-way clutch 52 allows the torque converter 28 to turn in relation to the engine when driven by its output shaft 56.

The torque converter 28 consists of the pump impeller 51, a turbine 57 and a reaction member 58. Turbine 57 is mounted and splined on output shaft 56. The latter is mounted in a pilot bearing 59 in the end of shaft 49 and in other bearings 60, one of which is in the cover 55 and the other in a housing 61 mounted in a housing 62 connected to a bell-shaped extension 63 of the speed-up gear housing 46. Reaction member 58 is splined on the outer race member 64 of a one-way clutch mounted on bearings 65 and 66 on shaft 56 and in housing 61, the said clutch having sprags 67 operating between the aforesaid outer race 64 and an inner race member 68 forming a fixed part of housing 61. Channels 69 and 70 are passages for oil circulation in and out of the torque converter 28.

In the transfer gearbox 29, as shown in Figs. 6 and 7, the input shaft 30 is mounted in bearings 71 and the output shaft 31 is mounted in bearings 72 in housing 73. Two gears 32 and 34 are rotatably mounted on the input shaft 30. A shifter clutch member 74 is slidably mounted on shaft 30 on splines 75 between gears 32 and 34 and is axially movable and adapted to mesh with its splines external gear teeth 76 and 77 provided on the hubs of gears 32 and 34 for forward or reverse drive. The left hand gear 32 meshes directly with a gear 33 on the output shaft 31 for forward drive, and the right hand gear 34 drives by means of an idler gear 35 (Fig. 7) the other gear 36 on the output shaft 31. The idler gear 35 is rigidly mounted on a shaft 78 which, as appears in Fig. 13, carries on each end an impeller 79 of a hydraulic brake 80. The gears 33 and 36 are fixed as by keys on the output shaft 31 and the latter carries on each end a sun gear 81 of a planetary gearing 82, shown in Fig. 8.

Figure 8:
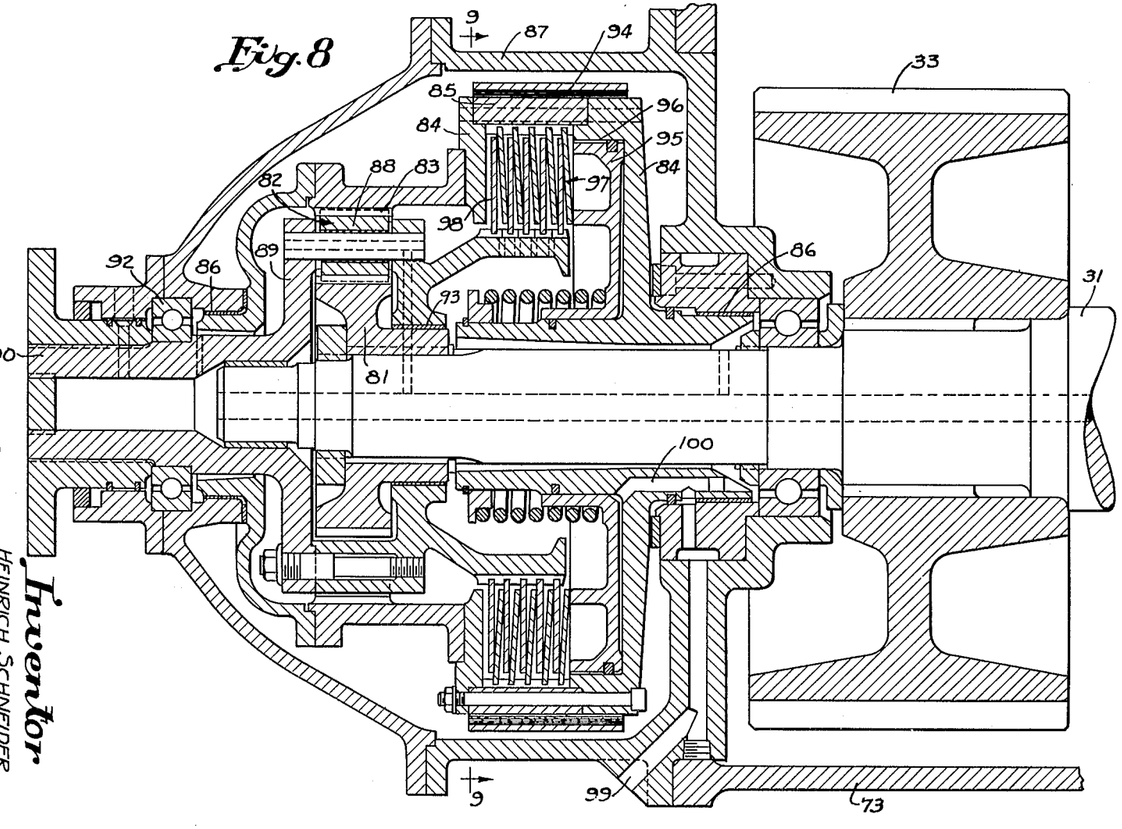
Fig. 8 is a longitudinal section through the planetary gearing.

Referring to Fig. 8, each planetary gearing 82 includes a ring gear 83 which is a part of a rotor 84, of which a brake drum 85 forms another portion. The rotor 84 is mounted in bearings 86 in the stationary housing 87. Planetary gears 88 mesh with the aforesaid sun gear 81 and ring gear 83 and are mounted on a planetary carrier 89 which is rigidly connected with output shaft 90 drivingly connected by means of a universal joint 91 with the propeller shaft 38. The carrier 89 is mounted in a bearing 92 in housing 87 and in another bearing 93 on the sun gear hub. A brake band 94 surrounds the brake drum 85, and a ring piston 95 is operable in a cylinder 96 provided in the rotor 84. A clutch 97 for connecting carrier 89 and rotor 84 consists of a plurality of discs 98 alternate ones of which are carried in splines in the rotor 84 and intermediate ones in splines on carrier 89. Channels 99 and 100 in the housing 87 and rotor 84 serve as fluid inlet and outlet passages for the cylinder 96.

Referring now to Figs. 9 and 10, brake band 94 is operated by one or the other of two pistons 101 in cylinders 102 by means of bell-crank levers 103 pivoted on pins 104 fixed in housing 87. When brake drum 85 tends to turn in a clockwise direction, air pressure is applied in right hand cylinder 102 and piston 101 pulls the long fulcrum lever 103 upwards, moving the short end 105 to the left, tightening brake band 94, while the other end of the brake band pulls the short end 106 of the left hand fulcrum lever 103 against its adjustable stop 107. When the brake drum 94 tends to turn in the other direction, air pressure is applied in the left hand cylinder 102 and the left hand lever 103 and the right hand stop 108 come into operation. This arrangement enables using only one brake band 94 to hold the brake drum 85 in forward and reverse drive.

Figure 11:
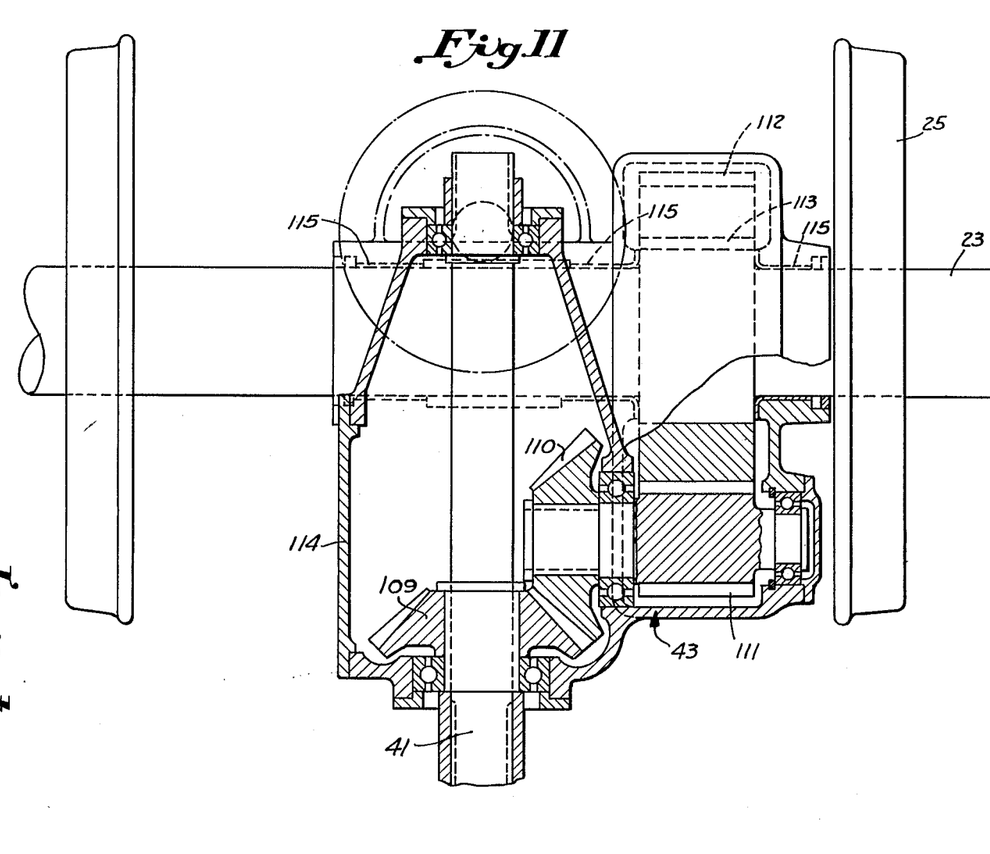
Figs. 11 and 12 are two views of the axle drive gears.
Figure 12:
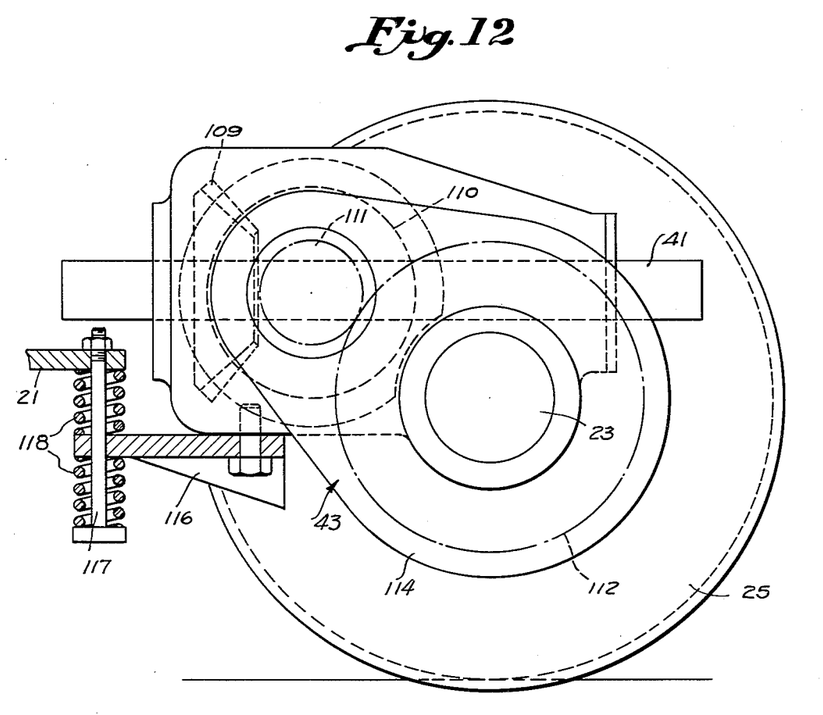

Figs. 11 and 12 show the axle drive gear units 43 consisting of bevel gears 109 and 110 and spur gears 111 and 112. Bevel gear 109 is mounted on a wheel truck section, like 41, of the propeller shaft, and bevel gear 110 forms a fixed extension of spur gear 111, while the larger spur gear 112 is fixedly mounted on the driving axle 23 as by one or more keys 113. All gear shafts and gears are mounted in the axle gear housing 114, which is mounted on bearings 115 on the driving axles 23 and is spring mounted in the usual way to the locomotive frame 21, as shown in Fig. 12 at the left, by bracket 116, rod 117 and springs 118. The axle drive gear housings 114 are so arranged on the driving axles 23 that the propeller shaft lengths 38 and 40 in both directions from the transfer gearbox 29 are equal.

Figure 14:
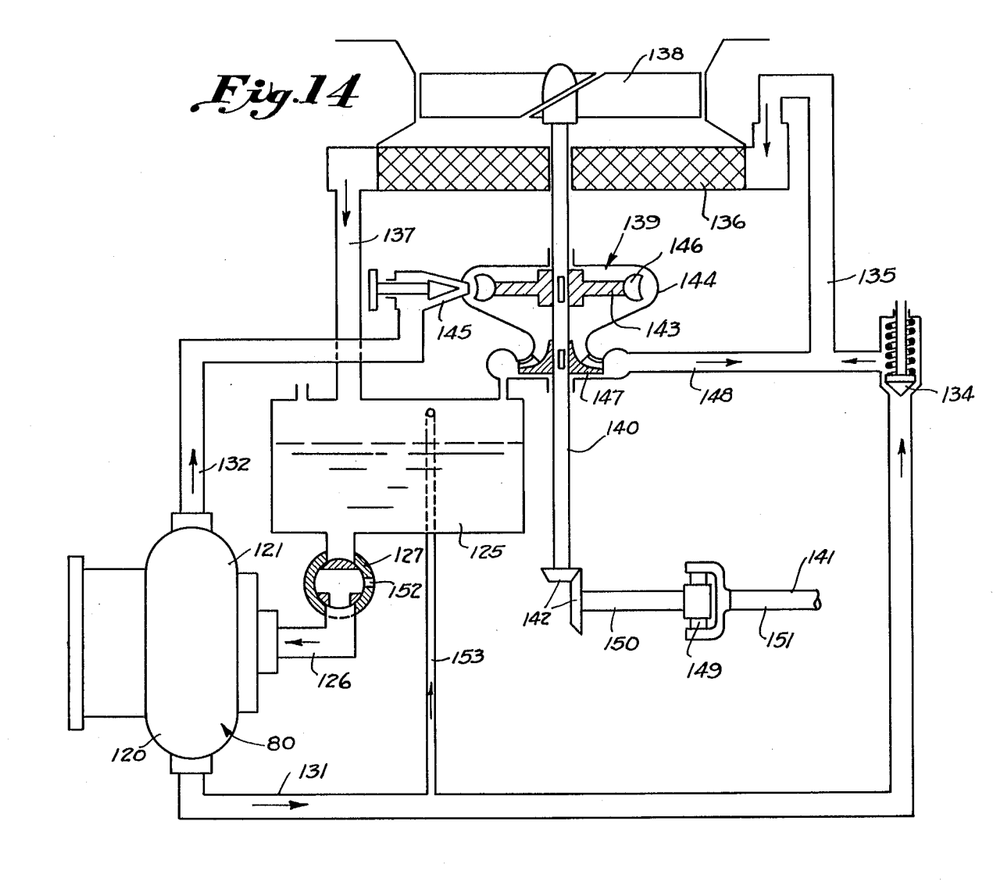
Fig. 14 shows a diagram of the cooling and circulation system for the hydraulic brakes.
Figure 15:
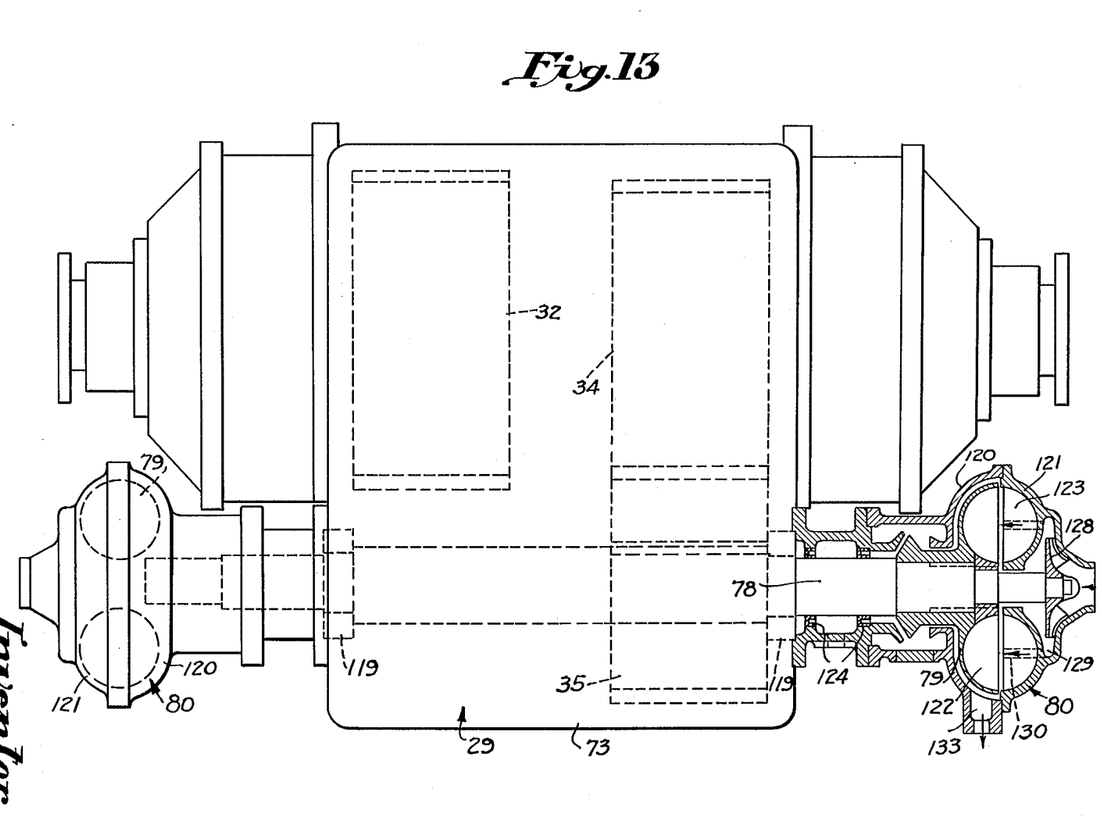
Fig. 15 is a set of curves showing the tractive effort and torque converter efficiency in relation to locomotive speed at low and high speed gear ratios.

In Fig. 13 is shown the idler gear 35 of the reverse gearing in the transfer gearbox 29 fixedly mounted on shaft 78 carried in bearings 119 in housing 73. On each free end extension of the shaft 78 is mounted an impeller 79 forming part of a hydraulic brake 80. Stationary housings 120 and 121 enclose impeller 79, the blades 122 of which are substantially radially disposed and cooperate with the substantially radial blades 123 in housing 121, so that the latter constitutes a reaction member. Seals 124 prevent brake fluid from getting into the transfer box 29 from either brake housing. The brakes 80 are preferably operated with water, but could be operated with oil or other fluid. Each brake 80 is arranged to be filled from a cool water tank 125, as shown diagrammatically in Fig. 14, through pipe 126 controlled by a 3-way valve 127, entering reaction member housing 121. As shown in Fig. 13, a centrifugal pump impeller 128 mounted on shaft 78 discharges water into chamber 129 from whence it flows through channels 130 in blades 123 to substantially the center of the vortex ring formed by impeller 79 and reaction member 121. The fluid is discharged from brake 80 at high pressure as a result of the rotation of impeller 79, the fluid going through pipes 131 and 132 communicating with a recess 133 at the periphery of housing 120. A relief valve 134 in pipe 131 lets the fluid escape through pipe 135 and through radiator 136 and pipe 137 back to tank 125, when the pressure exceeds a predetermined value. Fan 138 and radiator 136 are preferably the regular water cooling equipment for the power plant's cooling water. As the power plant 26 is idling during braking this radiator 136 is used here to cool the brake water. To obtain increased cooling capacity the fan speed is increased during braking by means of a turbine 139 driven by the discharge water from the brake 80. Fan 138 draws air through radiator 136 and is driven by shafts 140 and 141 that are connected by means of bevel gears 142, shaft 141 being driven either directly by the power plant 26 or some auxiliary power source. Shaft 141 also drives the turbine 139, which is preferably of the Pelton type, comprising a runner 143 enclosed by housing 144. The water discharged from the brake 80 is led through pipe 132 to the turbine nozzle 145 and impinges on buckets 146 of turbine runner 143 whereby to drive fan 138. A centrifugal pump 147 arranged below the turbine 139 on shaft 140 discharges the water from the turbine through pipes 148 and 135 to the radiator 136 and thence to tank 125. A one-way clutch 149 arranged between sections of driving shaft 141 allows section 150 of shaft 141 to be driven at increased speed by the turbine 139 and run faster than section 151 of shaft 141, the one-way clutch 149 meanwhile over-running. The turbine 139 idles when the brake 80 is not in use and fan 138 is then driven by means of one-way clutch 149 by shaft 141. Inlet valve 127 is a 3-way valve letting water from tank 125 pass to the brake 80 in open position and in closed position (as shown) closing the water off from the tank to the brake and letting atmospheric air through an opening 152 to the brake. The air is discharged by impeller 79 through pipe 132 and through turbine nozzle 145 or through the small by-pass pipe 153. This air circulation assists in completely blowing out the water from the brake 80 and cooling the brake during idling. By reducing the inlet area 152 sufficiently a partial vacuum can be created in the brake 80, which decreases the idling losses. By throttling either the water inlet valve 127 or the turbine nozzle 145 more or less, the filling of the brake 80 can be controlled and therewith the power absorption of the brake. The setting of the relief valve 134 determines the maximum power absorbing capacity of the brake.

In Fig. 13 both brakes 80 on opposite ends of shaft 78 are preferably operated in parallel with the same cooling and valve system, and, in fact, all of the brakes on the axles are operated in parallel.

To reverse the locomotive, like that of Fig. 1, for example, the standard mechanical wheel brakes must first be applied to bring the locomotive to a standstill. Then, the brake band 94 and the disc clutch 97 in the planetary gearing shown in Fig. 8 are released. On the torque converter shaft 190 is arranged a brake drum 191 surrounded by a brake band 192 (similar to band 94 shown in Fig. 9 but having only one fulcrum lever 103 and one cylinder 102 only). Now, the brake band 192 is tightened on the drum 191, bringing the turbine shaft 190 to a standstill while the engine 26 idles at low speed. The collar 74 (Fig. 6), which is in forward drive position meshing with gear teeth 76, is shifted to the right, through neutral position, into mesh with gear teeth 77, for reverse drive. Inasmuch as the planetary sun gear 81 and ring gear 83 are free to rotate with the output shaft 31 of the transfer gear box, it is apparent that there is no force holding the clutch gear 76 in engagement with collar 74 and no force on the other hand counteracting the engagement of the collar 74 with gear 77, except the small possibility of abutment of the ends of the splines in the collar 74 with the ends of the gear teeth. The gear teeth and splines in question are rounded off on the ends and hence designed for easy engagement, so that the movement of collar 74 can be and is preferably accomplished in the usual way by compressed air and piston and lever means (not shown). After a hand lever (not shown), which controls the air shifting means and the collar 74, has been put in "reverse" position, the brake band 192 on the turbine shaft 190 is released, and the turbine shaft 190 and input shaft 30 begin to turn. Upon this first movement, the collar 74 is certain to move into complete engagement with gear 77, if it has not been so engaged before. Then the brake band 94 in the planetary gearing is applied, after the locomotive wheel brakes have been released and the engine is speeded up to start the locomotive moving in the reverse direction. When a certain locomotive speed has been attained, corresponding to the high speed ratio of the torque converter, the shift into high gear, called "direct drive," of the planetary gearing is obtained, by disengaging the brake band 94 and engaging the multiple disc clutch 97 by fluid pressure on piston 95 in cylinder 96. Both sets of planetary gears in fore and aft relation to the transfer box 29 are operated in parallel by the same air valve and pressure fluid valve (not shown).

It is believed the foregoing description conveys a good understanding of the objects and advantages of my invention. The appended claims have been drawn to cover all legitimate modifications and adaptations.

I claim:

1. A locomotive comprising, in combination, a frame supported at opposite ends on a pair of trucks having spaced parallel drive axles with driving wheels on opposite ends of each axle, a pair of unidirectionally running internal combustion engines mounted in spaced opposed aligned relation on the center line of the frame directly over the aforesaid trucks, said engines having crankshafts, speed-up gearing connecting the crankshafts of the respective engines to the impeller wheels of a pair of spaced coaxially aligned torque converters each through a one-way clutch so as to turn the impeller wheels in the same direction and at stepped up speed in relation to the engine or engines when either or both of said engines are running, a transfer gear-box mounted centrally of the frame and extending downwardly with respect thereto having therein selectively engageable forward and reverse drive gears which are connected on their input side at the top portion of said gear-box with the turbines of the torque converters, and substantially horizontal propeller shafts connected with the drive gears on their output side and extending longitudinally of the locomotive below the frame on the center line thereof from opposite sides of the lower portion of the gear-box and drivingly connected through bevel gears with the drive axles intermediate the ends thereof.

2. A locomotive as set forth in claim 1 wherein the driving connection for each drive axle consists of a spur gear on the axle meshing with a spur pinion on a shaft parallel with the axle, and a bevel gear driving said pinion and meshing with a bevel gear driven by the propeller shaft.

3. A locomotive as set forth in claim 1 wherein said transfer gear-box includes an output shaft the opposite ends of which transmit drive to the opposed propeller shafts, the locomotive including planetary gearing connecting each propeller shaft with the output shaft, said planetary gearing including a sun gear on the output shaft, a ring gear, planetary gears between and meshing with the sun gear and ring gear and mounted on a carrier turning with the propeller shaft, clutch means for connecting the carrier with the ring gear, and brake means for resisting turning of said ring gear.

4. A locomotive as set forth in claim 1 wherein the trucks are swivelled with respect to the frame supported thereby, and wherein each of the propeller shafts consists of a plurality of shaft sections connected by means of universal joints, one of the sections of each propeller shaft extending between and being connected with other shaft sections mounted in bearings in rigid relationship to the two drive axles of a truck.

5. A locomotive as set forth in claim 1 wherein said transfer gear-box includes an output shaft the opposite ends of which transmit drive to the opposed propeller shafts, the locomotive including planetary gearing connecting each propeller shaft with the output shaft, said planetary gearing including a sun gear on the output shaft, a ring gear, planetary gears between and meshing with the sun gear and ring gear and mounted on a carrier turning with the propeller shaft, clutch means for connecting the carrier with the ring gear, a friction brake band surrounding and engageable with a brake drum turning with the ring gear, and means connected with the opposite ends of said brake band for applying the brake comprising two fulcrum levers having relatively short arms connected to the ends of the band and having relatively long operating arms, a fluid pressure operable piston connected with each of the long arms and operable in a cylinder mounted in fixed relation to the gear-box, and adjustable stops for limiting the pivotal movement of the fulcrum levers in the release direction, the piston and one cylinder being operable under fluid pressure to tighten the brake band when the drum turns in one direction, and the piston in the other cylinder being operable under fluid pressure to tighten said band when the drum turns in the other direction.

6. A locomotive as set forth in claim 1 wherein the transfer gear-box includes a high speed idler shaft turning with the intermediate idler gear of the reverse gears, the locomotive including an emptiable and refillable hydraulic brake of the impeller type the impellers of which are driven by said idler shaft, said idler shaft running at higher speed than the output shaft of the gear-box.

7. A locomotive as set forth in claim 1 wherein the transfer gear-box includes an input shaft the opposite ends of which are connected with turbine shafts extending thereto from the opposed torque converters, the locomotive including brake means associated with each of said turbine shafts for holding the same against turning.

8. In a power transmission for a vehicle of the class described comprising a power transfer gear box including a power operated input shaft, a power output shaft, and reverse gears which include an idler gear on an idler shaft meshing with gears on the input and output shafts, an emptiable and refillable hydraulic brake of the impeller type driven by said idler shaft, said idler shaft running at higher speed than the aforesaid output shaft.

References Cited in the file of this patent

UNITED STATES PATENTS

| | | |
|---|---|---|
| 651,573 | Lanchester | June 12, 1900 |
| 680,825 | Westinghouse | Aug. 20, 1901 |
| 1,203,664 | Thomas | Nov. 7, 1916 |
| 1,386,979 | Wickersham | Aug. 9, 1921 |
| 1,424,446 | Buckendale | Aug. 1, 1922 |
| 1,447,488 | Schneider | Mar. 6, 1922 |
| 1,529,021 | Ford | Mar. 10, 1925 |
| 2,142,269 | Gossler | Jan. 3, 1939 |
| 2,150,150 | Barrows et al. | Mar. 14, 1939 |
| 2,229,336 | Neracher et al. | Jan. 21, 1941 |
| 2,426,365 | Matlock | Aug. 26, 1947 |
| 2,575,242 | Allen | Nov. 13, 1951 |

FOREIGN PATENTS

| | | |
|---|---|---|
| 216,294 | Switzerland | Nov. 17, 1941 |
| 243,260 | Switzerland | Dec. 2, 1946 |